Dec. 16, 1969 K. D. WALLENTOWITZ 3,484,656
ELECTRONIC TIMER CIRCUIT HAVING FEEDBACK PROVISION
Filed March 3, 1967
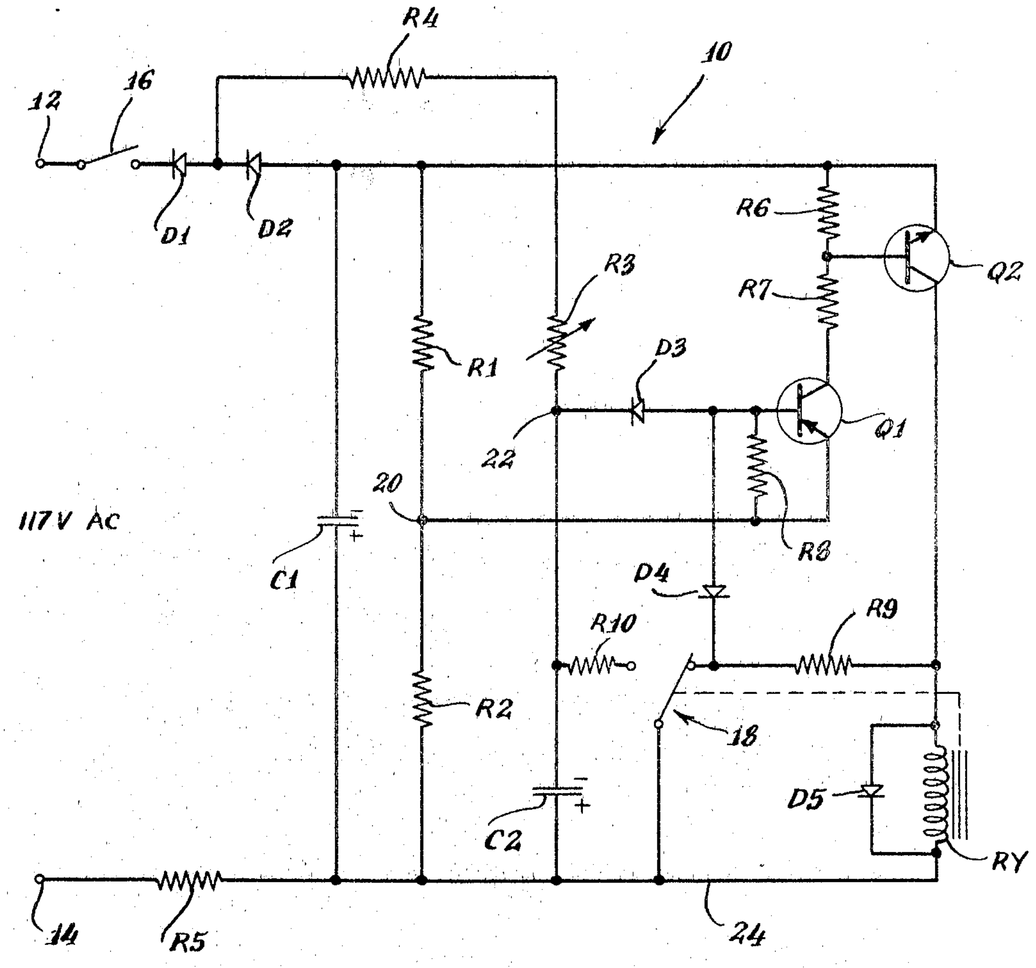
INVENTOR.
Klaus D. Wallentowitz
BY
Mattern, Ware & Davis
ATTORNEYS.

United States Patent Office 3,484,656

Patented Dec. 16, 1969

3,484,656
ELECTRONIC TIMER CIRCUIT HAVING FEEDBACK PROVISION

Klaus D. Wallentowitz, Waterbury, Conn., assignor to General Time Corporation, Stamford, Conn., a corporation of Delaware Filed Mar. 3, 1967, Ser. No. 620,317
Int. Cl. H01h 47/18, 47/32
U.S. Cl. 317—142 2 Claims

ABSTRACT OF THE DISCLOSURE

An electronic timer for effecting a time-delayed relay response to the application of an AC signal. A timing capacitor accumulates charge until a predetermined threshold is reached, at which time cascade-connected transistors are activated to energize an output relay.

A feedback connection from the output of the second transistor to the input of the first is disabled by a normally closed contact of the relay to provide immunity to transient impulses. When the relay is energized, feedback is effective to seal in the relay; simultaneously the timing capacitor is discharged in readiness for a new timing cycle.

RELATED APPLICATIONS

The timer disclosed in the present application utilizes the bridge circuit timer invention disclosed and claimed in my copending application, Ser. No. 405,503, filed Oct. 21, 1964, entitled "Electronic Timer Circuit." That application is assigned to the same assignee as the present invention.

The present invention was made during a program of electronic timer development at applicant's assignee's Industrial Controls Division Engineering Department and the following United States patent applications resulting from said development exemplify the prior art: The U.S. patent applications of Robert S. Lundin, Ser. No. 472,844, filed July 19, 1965, entitled "Condition Responsive Input Controllers"; Ser. No. 479,553, filed Aug. 13, 1965, entitled "Condition Responsive Process Timer"; Ser. No. 589,335, filed Oct. 25, 1966, entitled "Relay Circuit For Half-Wave Alternating Current Energization And Electronic Timer Employing The Same"; Ser. No. 590,707, filed Oct. 31, 1966, entitled "Electronic Timer Circuits"; and Ser. No. 620,316, filed herewith, entitled "Solid State A.C. Relay And Electronic Timer Employing The Same"; my U.S. patent applications, Ser. No. 589,336, filed Oct. 25, 1966; Ser. No. 591,016, filed Oct. 31, 1966; Ser. No. 616,527, filed Feb. 13, 1967; and Ser. No. 616,354, filed Feb. 15, 1967; all entitled "Electronic Timer Circuit(s)"; and Ser. No. 616,370, filed Feb. 15, 1967, entitled "Electronic Timer Circuits Providing Switching At Multiple Intervals"; the U.S. patent application of Klaus D. Wallentowitz and Robert S. Lundin, Ser. No. 620,543, filed herewith, entitled "Electronic Timer Circuit"; the U.S. patent application of Robert S. Lundin and Klaus D. Wallentowitz, Ser. No. 616,527, filed herewith, entitled "Sequential Timing Circuit"; the U.S. patent application of George J. Yagusic, entitled "Delay on De-energization Electronic Timers," Ser. No. 595,993, filed Nov. 21, 1966; and the U.S. patent applications of Edward T. Bosman entitled "Electronic Timer Circuits," Ser. No. 595,955, filed Nov. 21, 1966, and Ser. No. 601,780, filed Dec. 14, 1966. All of the above-identified applications are assigned to the same assignee as the present application.

BACKGROUND OF THE INVENTION

This invention relates to a utility delay timer. More particularly, it relates to an electronic delay timer that provides at low cost a broad range of time delays and which exhibits qualities of rapid reset, and insensitivity to line transients and electro-magnetic radiation.

In FIGURE 4 of my above-identified application, Ser. No. 591,016, there is disclosed a bridge circuit for a capacitor charging electronic timer wherein the capacitor is charged with half-wave alternating current and the reference potential is provided by a potential divider supplied with direct current from the same alternating current supply.

In the above-identified application of Edward T. Bosman, Ser. No. 595,955, there is disclosed an inexpensive rectifier circuit for such bridges. In my above-identified application, Ser. No. 616,527, filed Feb. 13, 1967, there is disclosed and claimed a delay timer having a relay output utilizing only two transistors for the capacitor charge detection and the relay load-controlled functions through the use of a feedback circuit. The delay timer of the present invention utilizes the above inventions and provides desirable improvements therein.

The basic desirable characteristics of a utility electronic delay timer are timing accuracy and good repeat accuracy, or a rapid reset feature (that is, the timer must be able to be re-started quickly after completing a delay function, and such quick re-energization of the timer must not adversely affect timing accuracy). Furthermore, the timer may be employed under extremely adverse conditions of line voltage variations and line voltage transient pulses, and may be subjected to strong electromagnetic fields from nearby motors and relays. These conditions adversely affect the functioning of prior art timers.

Various means for protecting against transients and radiation have been employed. For example, various capacitor-resistor filter circuits are employed in many of the timers of the above-identified applications. Furthermore, the above qualities must be provided at low cost in order to compete with electro-mechanical and pneumatic timers, as well as with other electronic timers on the market.

I have found, for example, that under adverse conditions of transients and noise in the detector latching circuit of my above-identified application, Ser. No. 616,527, filed Feb. 13, 1967, the reverse potential applied to the control junction of the detector transistor may exceed its breakdown voltage. Furthermore, at the end of the delay function when the timer switch is opened and then rapidly re-closed, due to residual energy in the filter capacitor and in the output relay, the feedback circuit may cause the output relay to immediately re-energize; thus, defeating the delay purpose of the timer.

SUMMARY OF THE INVENTION

It is, therefore, an object of the present invention to provide an electronic utility timer.

Another object of the invention is to provide a utility timer of the above character having a high degree of repeat accuracy and a short reset time.

A further object of the invention is to provide a utility timer of the above character that is insensitive to line transients and electro-magnetic noise.

Still another object of the invention is to provide a utility timer of the above character in which the timing determining element is a capacitor.

Another object of the invention is to provide a utility timer of the above character wherein the detector junction of the capacitor charge sensing transistor is protected against high reverse voltages.

Still another object of the invention is to provide a utility timer of the above character that is inexpensive, rugged and reliable.

A further object of the invention is to provide a utility delay timer of the above character.

Other objects of the invention will in part be obvious and will in part appear hereinafter.

The invention accordingly comprises the features of construction, combinations of electrical elements, and electrical circuit arrangements which will be exemplified in the electronic timer circuit herein disclosed.

In general the present invention comprises the use of a transfer switch 18 operated by load relay RY for preventing operation of the feedback circuit comprising resistor R9 and diode D4 until relay RY is energized and for rapidly discharging the timing capacitor C2 when the relay RY is energized. The invention further comprises connecting a resistor R8 across the base-emitter junction of detector transistor Q1. This resistor insures that any reverse bias applied across the control junction of Q1 and the diode D3 connected in circuit therewith will be largely applied across the diode due to the diode's inherently high resistance.

THE DRAWING

For a fuller understanding of the nature and objects of the invention, reference should be had to the following detailed description taken in connection with the accompanying drawing in which the sole figure is a schematic electrical circuit diagram of a preferred embodiment of my invention.

SPECIFIC DESCRIPTION

Now referring to the drawing, a delay timer 10, according to the invention, is connected to a source of 117 volt alternating current potential at terminals 12 and 14. The timing function is initiated by closing switch 16. Diode D1 is a 200 volt diode to protect the circuit from high reverse voltages, diode D2 is a 100 volt diode supplying the DC portion of the circuit. The timing capacitor C2 is charged with half-wave alternating current through fixed resistor R4 and variable resistor R3. Capacitor C1 serves as the filter capacitor for the DC portion of the circuit. Thus, potential divider R1 and R2 provides a reference DC potential at terminal 20 against which the potential across the capacitor C2 at terminal 22 may be compared. The timing capacitor C2 is charged with half-wave rectified alternating current. Thus, the time required to charge it is approximately $\pi$ times that required if it were charged with direct current. Furthermore, after termination of the timing interval, filter capacitor C1 cannot discharge into timing capacitor C2 due to its polarity and the blocking action of diode D2.

The end of a timing interval—when the potential difference between terminals 20 and 22 is equal to the junction potentials of diode D3 and the base-emitter junction of transistor Q1—is detected by the transistor Q1 which becomes conductive, completing a circuit through resistor R2 and resistors R6 and R7. Transistor Q2 then conducts and energizes relay RY.

Upon energization, relay RY transfers switch 18 to connect resistor R10 across capacitor C2 and thereby quickly discharge it. Additionally, switch 18 then enables a feedback network comprised of resistor R9 and diode D4 to clamp the base of transistor Q1 at a negative enough potential to maintain its energization. The circuit effectively latches and relay RY will not de-energize until the switch 16 is opened.

When the switch 16 is opened, the energy of relay RY is rapidly discharged through diode D5. Switch 18 transfers effectively shorting out the feedback circuit, since the base of transistor Q1 is now connected through diode D4 to the positive bus 24. Transistor Q1 is latched OFF. This prevents any possible re-energization of relay RY if switch 16 is again quickly closed to supply power to the timer 10. Furthermore, the latch circuit is thus made insensitive to transients and no capacitor is needed across the control junction of transistor Q2.

Resistor R8 has a resistance much lower than the reverse biased leakage resistance of diode D3. This insures that the major portion of any such reverse bias occurs across diode D3 and not across the base-emitter junction of transistor Q1. Since diode D3 has a high leakage resistance, it prevents leakage of charge from timing capacitor C2 through the control junction of transistor Q1 and resistor R8.

Resistor R5 is a dropping and surge protecting resistor for the circuit.

Typical values of components that may be used in the above-described circuit are as follows: resistors R1 and R2 are each 1 kilohm plus or minus 10%, rated at one watt; resistor R2 is a 500 kilohm plus or minus 10% potentiometer; resistor R4 is 3.9 kilohms, rated at one-half watt; resistor R5 is 900 ohms plus or minus 5%, rated at 5 watts; resistor R6 is 10 kilohms; resistor R7, 3.9 kilohms; resistor R8, 470 kilohms; resistor R9, 10 kilohms, all plus or minus 10% one-half watt resistors. Transistor Q1 may be a type 2N4248; and transistor Q2 a type 2N3568. Diode D1 is a type DE200; diode D2, a type DE100; diode D3, a type DE50S; diode D4, a type DE50; and diode D5, a type DE50, all supplied by Semiconductor Products. Relay RY is a 48 volt direct current relay with a coil resistance of 2.5 kilohms. Filter capacitor C1 is a 35 microfarad, 75 volt capacitor; and timing capacitor C2 is a 50 microfarad, 50 volt capacitor for a sixty second time range.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. An electronic timer circuit comprising in combination:

an input terminal for connection to an alternating current source voltage;

switching means for applying said source voltage to said circuit to start a timed interval;

a timing circuit including a capacitor and an adjustable resistor for producing a gradually increasing control signal in response to the application of said source voltage by said switching means;

a first transistor having an input coupled to said timing circuit and rendered conductive as said control signal exceeds a predetermined level;

a relay;

a second transistor connected for response to conduction in said first transistor and having an output connected to said relay for energizing said relay and thereby ending said timed interval;

feedback means connected between the output of said second transistor and the input of said first transistor to hold said first transistor in conduction by supplying additional input current thereto;

said relay having a first contact connected to said timing circuit for discharging the capacitor when the relay is operated at the end of the timed interval, said relay having a second contact connected to the feedback means for normally disabling the feedback means but for making the feedback means effective when the relay begins to operate thereby to avoid temporary indecision of the relay at the end of the timed interval.

2. An electronic timer circuit according to claim 1 wherein a shunting circuit is provided for the feedback means and in which the second contact is included in the shunting circuit, the second contact being normally closed so that the feedback means is normally disabled to minimize response of the relay to transient impulses.

References Cited

UNITED STATES PATENTS

| | | | |
|---|---|---|---|
| 3,109,964 | 11/1963 | Winchel ---------- | 317—148.5 |
| 3,210,613 | 10/1965 | Prapis. | |
| 3,243,601 | 3/1966 | Higenbothan. | |
| 3,246,209 | 4/1966 | Multari et al. | |
| 3,303,396 | 2/1967 | Culbertson. | |

FOREIGN PATENTS

| | | |
|---|---|---|
| 899,354 | 6/1962 | Great Britain. |

LEE T. HIX, Primary Examiner

W. H. BEHA, Jr., Assistant Examiner

U.S. Cl. X.R.

317—148.5